Nov. 21, 1933.  J. E. HUMMELL  1,935,714

TUBE FLANGING DEVICE

Filed April 20, 1932

INVENTOR.
John E. Hummell
BY
Fay Oberlin & Fay
ATTORNEYS.

Patented Nov. 21, 1933

1,935,714

UNITED STATES PATENT OFFICE 1,935,714

TUBE FLANGING DEVICE

John E. Hummell, Cleveland, Ohio, assignor to Flange and Tools, Inc., Cleveland, Ohio, a corporation of Ohio Application April 20, 1932. Serial No. 606,348

14 Claims. (Cl. 153—79)

This invention relates, as indicated, to tube flanging devices, but has reference more especially to devices of this character which may be used for flaring or flanging the ends of thin walled steel conduit or tubing.

A common type of mechanical joint between lengths of thin walled tubing is formed by flanging or flaring the walls of the tubing at the ends which are to be joined and providing suitable mechanical coupling devices for maintaining the flanged ends of the tubing in assembled relation.

It is desirable to form such mechanical joints quickly in the field, and to provide for this purpose a portable device which may be used to flare or flange the ends of the lengths of tubing which are to be thus joined.

The present invention accordingly has as its primary object a portable device of the character described, in which a length of steel conduit or tubing may be readily and firmly gripped, the end thereof quickly and easily flanged, and the flanged tubing removed without difficulty from the device. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
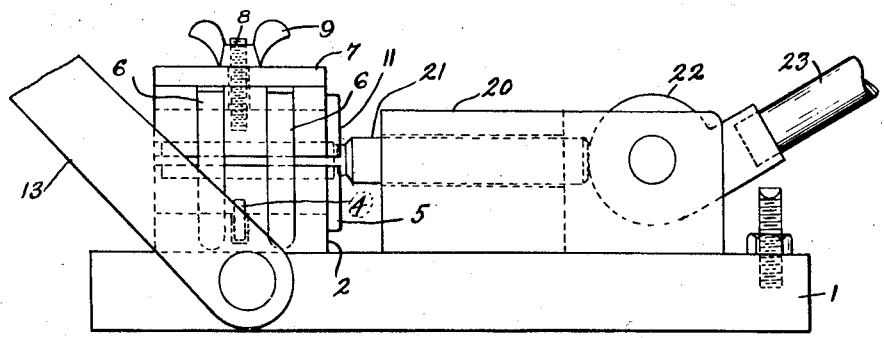
Figure 2:
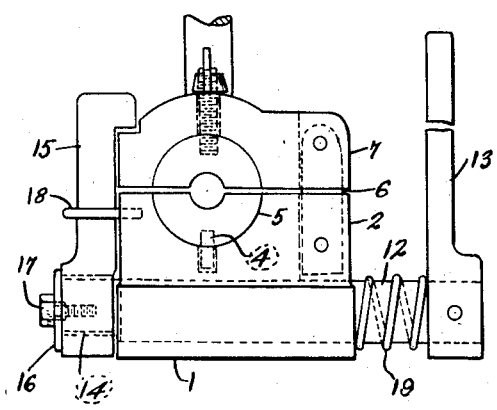
Figure 3:
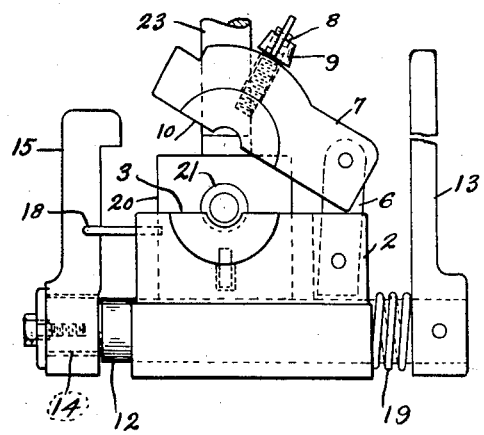
Figure 4:
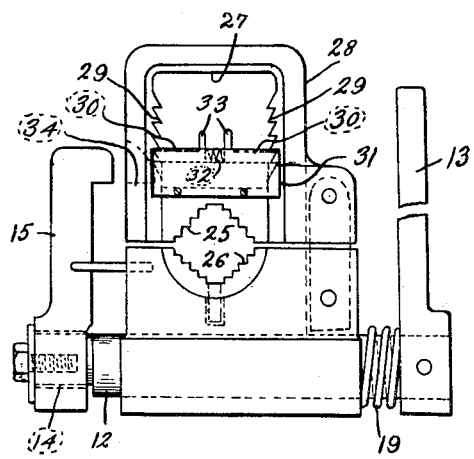

In said annexed drawing:

Fig. 1 is a side elevation of the tube flanging device; Fig. 2 is an end elevation of the device, with the tube gripping jaws thereof in closed position; Fig. 3 is a view, similar to Fig. 2, but showing the tube gripping jaws released and slightly separated; and Fig. 4 is a view showing a modified form of the tube gripping mechanism.

Referring more particularly to that form of the invention shown in Figs. 1 to 3, 1 designates a heavy metal base having thereon tube gripping mechanism including a lower jaw supporting block 2, in which is mounted the lower jaw 3, a pin 4 being provided for the purpose of holding the jaw against lateral or endwise shifting movement with respect to the block 2. The jaw 3 is provided with an end flange 5. Pivotally secured to the block 2, as by means of links 6, is the upper jaw supporting block 7, to which is secured, as by means of a threaded stud 8 and a butterfly nut 9, the upper jaw 10 of the tube gripping mechanism. The jaw 10 is provided with an end flange 11.

Extending through a transverse aperture in the base 1 is a shaft 12, to one end of which is pinned an operating lever 13. The opposite end of the shaft 12 is formed as an eccentric 14, and loosely mounted on this eccentric is a locking lever 15, which is maintained in position on the eccentric by means of a plate 16 and bolt 17. A pair of spaced pins 18 which extend from the block 2 serve to maintain the lever 15 in upright position at all times. A coil spring 19, which is mounted on the shaft 12 between the base 1 and the operating lever 13, normally maintains the locking lever 15 in the position shown in Fig. 2.

Slidably mounted in a block 20, which is an integral part of the base 1, is a flanging tool 21, one end of which is formed to properly flange the tube and the other end of which is adapted to be abutted by the tool operating cam 22, which is pivotally mounted on the block 20, and is provided with an operating handle 23.

In the operation of the device, the tube which is to be flanged is mounted in the lower jaw 3, with the end thereof which is to be flanged projecting to the desired extent beyond the flange 5 of the jaw. The upper jaw 10 is then brought down over the tube to the position shown in Fig. 2, and the spring 19 forces the hook-like upper end of the locking lever 15 to overhang the upper jaw holding block 7. The shaft 12 is then rotated by means of the lever 13 sufficiently to cause the eccentric 14 to pull down the locking lever 15 and maintain the jaws in tightly gripping engagement with the tube which is positioned between the jaws. The handle 23 is then raised, causing the cam 22 to move the flanging tool 21 axially to the left, as viewed in Fig. 1. The end of the tool 21 flares the wall of the tubing to form a flange which makes an angle of approximately 45° with the axis of the tubing. In order to remove the flange tubing, the handle 13 is rotated sufficiently to relieve the pressure of the lever 15 on the block 7, and the lever 15 is then pushed outwardly to the position shown in Fig. 3, whereupon the upper jaw may be lifted to permit removal of the tubing.

The jaws 3 and 10 are removable, and may be replaced by jaws of different sizes for gripping conduit or tubing of various diameters.

In that form of the tube gripping mechanism shown in Fig. 4, jaws 25 and 26 are provided with teeth which assist in firmly gripping the tubing which is to be flanged. In order to grip tubing of various diameters, the upper jaw 25 is so constructed as to be movable vertically in a recess 27 in the jaw holding block 28, and the walls of this recess are formed as racks 29, which are adapted to be engaged by detents 30, slidable in guide plates 31 secured to the upper jaw. The detents 30 are normally pressed outwardly by means of a coil spring 32, but when it is desired to release them from engagement with the racks, they may be pressed inwardly against the tension of the spring 32 by means of fingers 33 which extend upwardly from the detents. After the jaw 25 has been moved down to the desired position and in engagement with the tubing, the locking lever 15 may be operated to apply the final pressure to the block 28, a recess 34 being provided in the block to receive the hook-like end of the lever 15. The mechanism shown in Fig. 4 is also adapted to be used as a vise for threading pipe.

It is desired to stress particularly the fact that the device herein described is adapted for the flanging of steel conduit, whereas prior devices of a similar character could be used only for the flanging of softer metals, such as brass, copper, lead, etc.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a tube flanging device, means for gripping a tube to be flanged, means for locking said gripping means together, spring means for normally maintaining said locking means in operative position, and means for flanging the end of the tube.

2. In a tube flanging device, means for gripping a tube to be flanged, means for locking said gripping means together, spring means for normally maintaining said locking means in operative position, means for releasing said locking means, and means for flanging the end of the tube.

3. In a tube flanging device, complementary gripping jaws for the tube to be flanged, a locking lever having a hook-like end for locking said gripping jaws together, and means for transversely shifting said locking lever out of locking position.

4. In a tube flanging device, complementary gripping jaws for the tube to be flanged, a shaft extending transversely of said device, a locking lever for said jaws on one end of said shaft, and an operating lever on the other end of said shaft for shifting said shaft to move the locking lever out of locking position.

5. In a tube flanging device, complementary gripping jaws for the tube to be flanged, a shaft extending transversely of said device and formed with an eccentric at one end, a locking lever mounted on said eccentric and operative to lock the jaws together, and means for rotating said shaft to increase the locking pressure of said lever.

6. In a tube flanging device, means for gripping a tube to be flanged comprising complementary pivoted gripping jaws, a locking lever having a hook-like end operative to lock said jaws together when in tube gripping position, and cam means for increasing the locking pressure of said lever.

7. In a tube flanging device, means for gripping a tube to be flanged comprising complementary pivoted gripping jaws, a transversely shiftable locking lever having a hook-like end for said jaws, and means for shifting said lever to unlock said jaws.

8. In a tube flanging device, means for gripping a tube to be flanged comprising complementary pivoted gripping jaws, a transversely shiftable locking lever for said jaws, means for shifting said lever to unlock said jaws, and spring means opposing the movement of said locking lever shifting means.

9. In a tube flanging device, a jaw holding block having a recess, the walls of which are provided with opposed racks, a jaw slidable in said recess and provided with detents, and spring means operable to move said detents into engagement with said racks to lock the jaw against movement in said recess.

10. In a tube flanging device, a jaw holding block having a recess, the walls of which are provided with opposed racks, a jaw slidable in said recess and provided with detents, spring means operable to move said detents into engagement with said racks to lock the jaws against movement in said recess, and means for moving said detents out of engagement with said racks.

11. Mechanism for gripping a tube or the like, comprising complementary gripping jaws, a transversely shiftable member having an end formed to overhang the jaws when in gripping relation, and spring means for normally holding said member in such position.

12. Mechanism for gripping a tube or the like, comprising complementary gripping jaws, a transversely shiftable member having an end formed to overhang the jaws when in gripping relaton, spring means for normally holding said member in such position, and means for shifting said member against the tension of said spring.

13. Mechanism for gripping a tube or the like, comprising complementary gripping jaws, a shaft having an eccentric at one end thereof, a member loosely mounted on said eccentric and having a portion adapted to normally overhang said jaws when in gripping relation, and means for rotating said eccentric to cause the overhanging portion of said member to lock said jaws together.

14. Mechanism for gripping a tube or the like, comprising complementary gripping jaws, an axially shiftable shaft having an eccentric portion at one end thereof, a member loosely mounted on said eccentric portion of the shaft and having a portion adapted to overhang said jaws when in gripping relation, spring means for normally holding said member in such position, means for rotating said shaft to cause the overhanging portion of said member to lock the jaws together, and means for shifting said member against the tension of said spring.

JOHN E. HUMMELL.